United States Patent
Falciani

[11] Patent Number: 5,722,710
[45] Date of Patent: Mar. 3, 1998

[54] EXPANDABLE PROTECTIVE LINER FOR VEHICLES

[76] Inventor: Robert J. Falciani, 9700 Ventnor Ave., Margate, N.J. 08402

[21] Appl. No.: 704,099

[22] Filed: Aug. 28, 1996

[51] Int. Cl.$^6$ .................................................. B60R 13/01
[52] U.S. Cl. ............................................................ 290/39.1
[58] Field of Search ............................... 296/39.1, 39.2, 296/37.16

[56] References Cited

U.S. PATENT DOCUMENTS

| | | | |
|---|---|---|---|
| D. 333,645 | 3/1993 | Tyler | D12/155 |
| 2,898,146 | 8/1959 | Yudenfreund | 296/39.1 |
| 2,911,253 | 11/1959 | Dewey | 296/39.1 |
| 3,653,710 | 4/1972 | Barnard | 296/39.1 |
| 4,279,439 | 7/1981 | Cantieri | 296/39 |
| 4,765,671 | 8/1988 | Allen | 296/39 |
| 4,789,574 | 12/1988 | Selvey | 428/31 |
| 4,848,826 | 7/1989 | Kuwabara et al. | 296/97 |
| 4,877,281 | 10/1989 | Altman | 296/39.1 |
| 4,968,548 | 11/1990 | Gibson et al. | 428/95 |
| 4,979,772 | 12/1990 | Carey et al. | 296/39.1 |
| 5,083,831 | 1/1992 | Foyen | 296/97.23 |
| 5,322,335 | 6/1994 | Niemi | 296/97.23 |

FOREIGN PATENT DOCUMENTS

| | | | |
|---|---|---|---|
| 406270731 A | 9/1994 | Japan | 296/37.16 |
| 95004671 A1 | 2/1995 | WIPO | 296/39.2 |

OTHER PUBLICATIONS

"Cargo Area Protectors." J.C. Whitney & Co., vol. 506J May 1989.

*Primary Examiner*—Gary C. Hoge
*Attorney, Agent, or Firm*—Norman E. Lehrer

[57] ABSTRACT

An expandable protective liner for protecting the rear cargo area of a vehicle which is defined by a floor, a pair of opposing side wall portions, a tail gate portion, and a seat back portion. The liner comprises a planar member with a front end, a rear end and two sides. A side panel extends from each of the sides of the planar member. A rear panel extends from the rear end of the planar member and a front panel extends from the front end of the planar member. At least two fold lines are formed across each of the side panels and the planar member so that the side panels and planar member can be partially folded over one another in order to be able to change the length of liner.

13 Claims, 2 Drawing Sheets

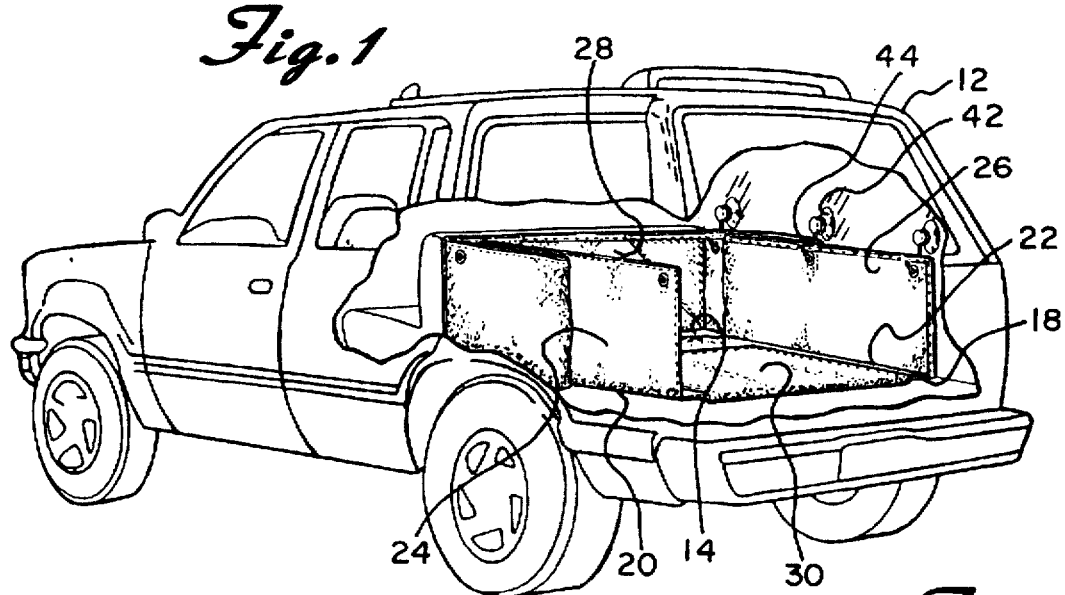
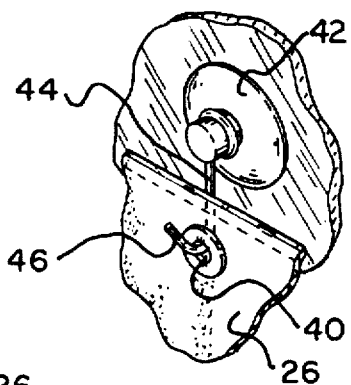
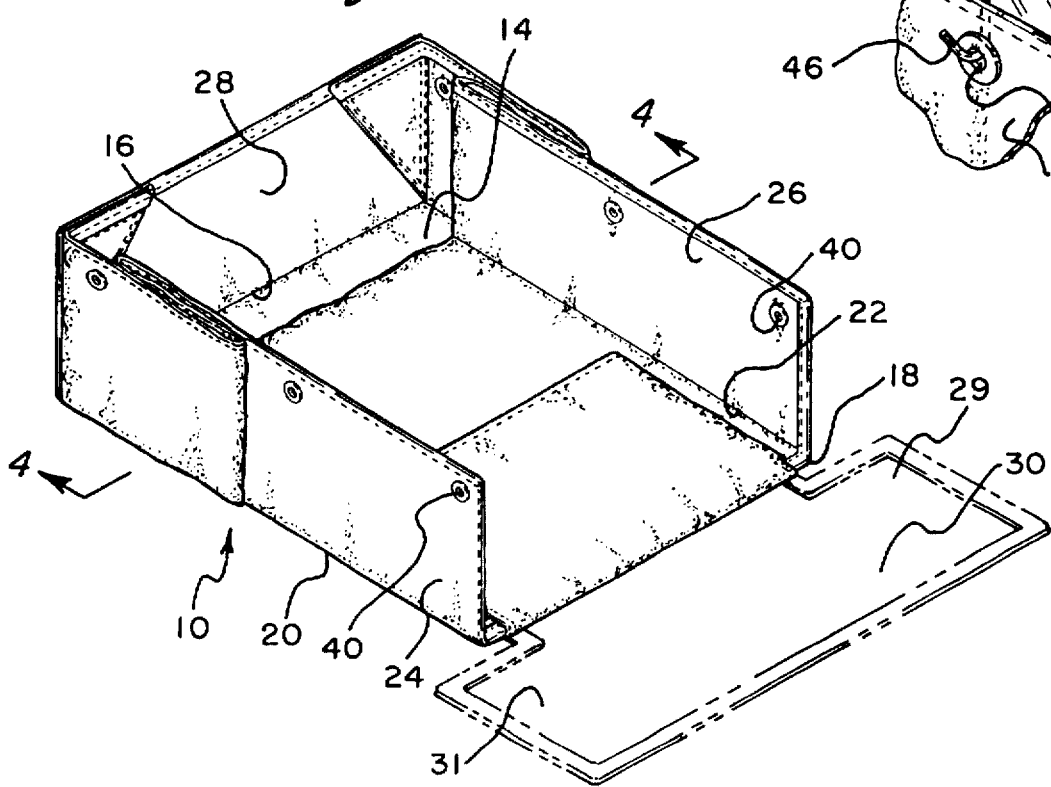

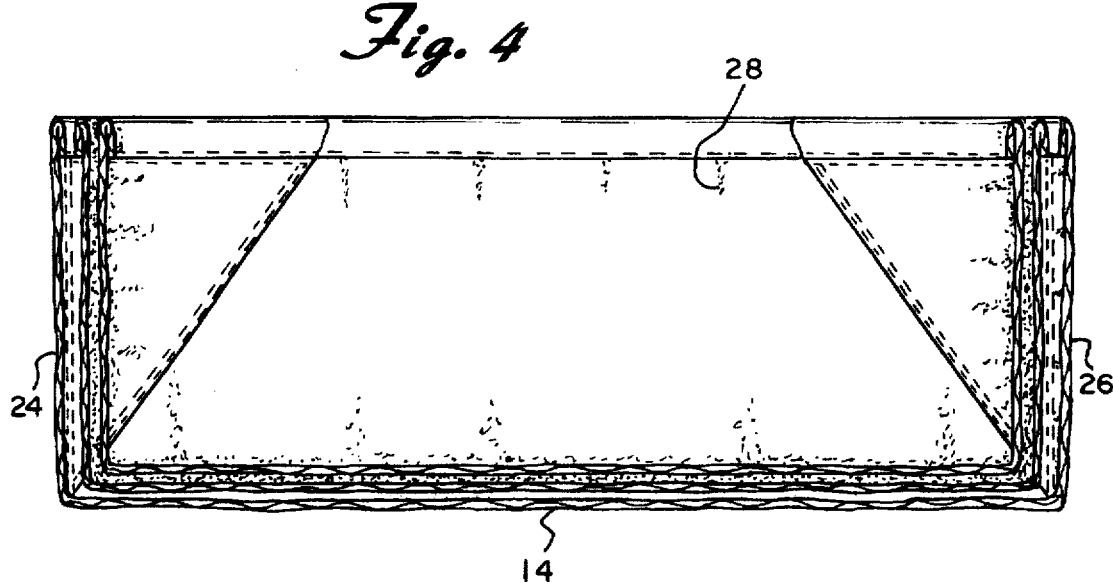
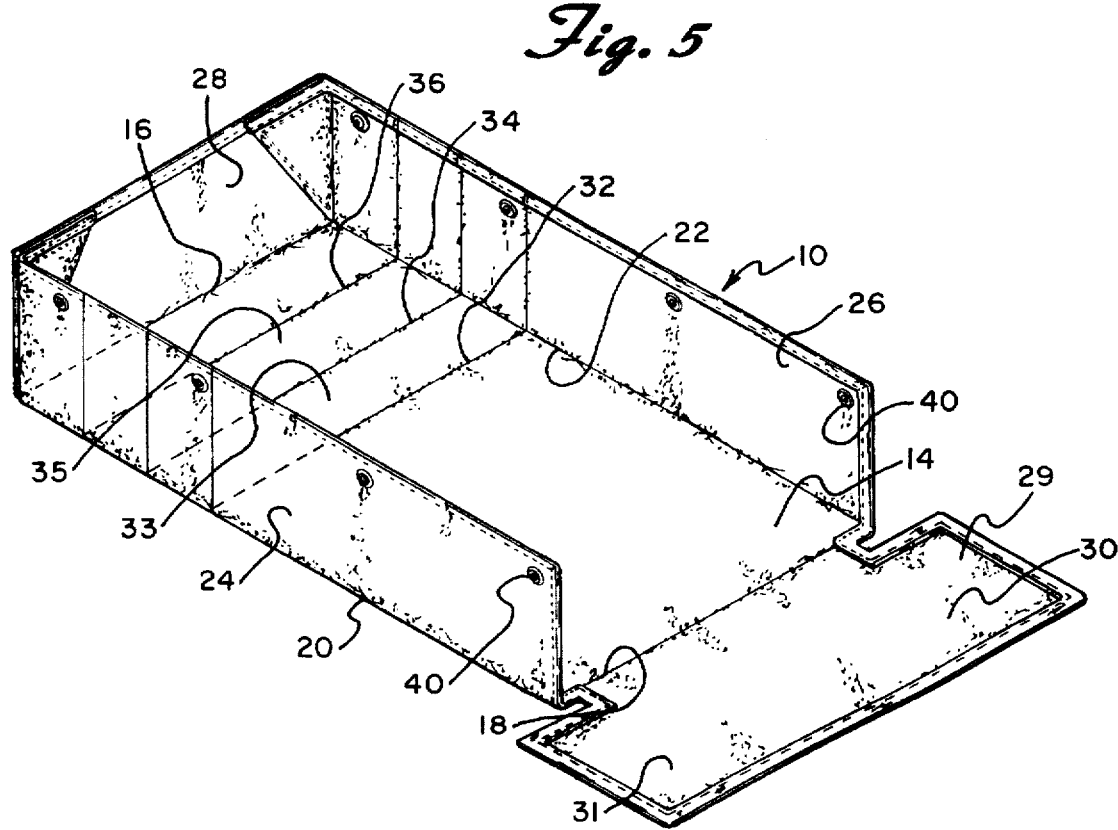

EXPANDABLE PROTECTIVE LINER FOR VEHICLES

BACKGROUND OF THE INVENTION

The present invention is directed toward an expandable protective liner for a vehicle and, more particularly, to such a liner that can be readily adapted to fit the rear cargo area of a number of differently sized vehicles.

Vehicles of the class known as sports utility include a rear bed or cargo area, the size of which is increased when the rear seat of the vehicle is folded forward. Defining the rear bed area are two side and end walls. The end walls comprise the rear surface of the tail gate portion of the vehicle and the seat back of the vehicle's front or rear seats. The rear cargo area provides a convenient area for transporting both animate and inanimate objects. A rear hatch back door provides access to the rear cargo area so that the same can be loaded or unloaded.

Repeated use often results in the deterioration of the rear cargo area. Specifically, the carpet, which covers the rear bed area, can be torn by sharp objects being placed into or out of the same. The carpet can also be soiled from contact with objects which are commonly hauled. Even further, the side panels and end panels of the vehicle which define the rear bed area can be similarly damaged.

In recognition of the foregoing, various liners for rear cargo areas have been developed. U.S. Pat. Nos. 4,279,439, 4,765,671, 4,789,574, 4,848,826, 4,968,548, 4,979,772, and 5,322,335 disclose examples of such liners. None of the liners disclosed in these patents is adapted to readily fit cargo bed areas of different sizes.

U.S. Pat. No. 5,083,831 discloses an expandable carpet protection device for protecting the carpet of a cargo bed area of a vehicle. The device shown is expandable to accommodate vehicle beds of different lengths. However, this carpet protection device does not protect the side and end walls of the cargo bed area. Further, the device is not adapted to be easily removed from the cargo bed area.

SUMMARY OF THE INVENTION

The present invention is designed to overcome the deficiencies of the prior art discussed above. It is an object of the invention to provide a liner which sufficiently protects the rear cargo area of a vehicle.

It is a further object of the invention to provide such a liner which can be easily installed and removed from the rear cargo area of a vehicle.

It is yet another object of the invention to provide a liner which can cover and protect rear cargo areas of different sizes.

In accordance with the illustrative embodiments, demonstrating features and advantages of the present invention, there is provided an expandable protective liner for a vehicle. The liner covers and protects the rear cargo area of a vehicle which is defined by a floor, a pair of opposing side wall portions, a tail gate portion, and a seat back portion. The liner comprises a planar member with a front end, a rear end and two sides. A side panel extends from each of the sides of the planar member. A rear panel extends from the rear end of the planar member and a front panel extends from the front end of the planar member.

At least two fold lines are formed across each of the side panels and the planar member so that the side panels and planar member can be partially folded over one another in order to be able to change the length of the liner. The protective liner also includes means for releasably securing the liner to the rear cargo area of a vehicle.

Other objects, features and advantages of the invention will be readily apparent from the following detailed description of a preferred embodiment thereof taken in conjunction with the drawings.

BRIEF DESCRIPTION OF THE DRAWINGS

For the purpose of illustrating the invention, there is shown in the accompanying drawings one form which is presently preferred; it being understood that the invention is not intended to be limited to the precise arrangements and instrumentalities shown.

FIG. 1 is a perspective view of an expandable protective liner shown mounted in a vehicle;

FIG. 2 is a perspective view of the expandable protective liner according to the present invention;

FIG. 3 is a perspective view of the means for securing the expandable protective liner to the rear cargo area of a vehicle;

FIG. 4 is a cross-sectional view taken along lines 4—4 of FIG. 2, and

FIG. 5 is a perspective view of the expandable protective liner in the unfolded condition.

DETAILED DESCRIPTION OF THE PREFERRED EMBODIMENT

Referring now to the drawings in detail wherein like reference numerals have been used throughout the various figures to designate like elements, there is shown in the figures an expandable protective liner for a vehicle constructed in accordance with the principles of the present invention and designated generally as 10.

The liner 10 is designed to protect the rear cargo area of a sports utility vehicle 12 or the like (FIG. 1). The rear cargo area of the vehicle is defined by a floor, a pair of opposing side wall portions, a tail gate portion, and a seat back portion.

The expandable protective liner 10 includes a planar member 14 having a floor portion 15 with a front end 16, a rear end 18 and two sides 20 and 22, respectively. A side panel 24 extends from side 20 of the planar member 14. Similarly, a side panel 26 extends from side 22. The planar member and the side panels have substantially equivalent lengths. A front panel 28 extends upwardly at a right angle from the front end 16 of the planar member 14 and a rear panel 30 extends from the rear end 18. The front panel 28 is preferably secured to each of the side panels as shown in FIGS. 2, 4 and 5. However, the front panel may also be hingedly connected to the front end 16 of the planar member 14 so that if the front panel 28 is positioned adjacent the seat back of the rear seats of the vehicle 12, it will rotate with the same if the rear seats are moved from their upright position to their folded position.

The rear panel 30 is preferably hingedly connected to the rear end 18 of the planar member 14 so that it can cover the tailgate portion of the sport utility vehicle when the tailgate portion is closed and positioned perpendicular to the floor or if it is opened and positioned parallel to the floor. Flaps 29 and 31 each extend outwardly from one of the sides of the rear panel as shown in FIG. 5. The flaps are adapted to hang over the sides of the tailgate portion when the same is placed in its opened position. When the tailgate portion is closed, the flaps 29 and 31 are folded inwardly so that they partially overlie the rear panel. The rear panel 30 preferably has a sufficient size to hang over the rear bumper of the vehicle (or the tailgate portion if it pivots downwardly) when the tailgate portion is opened.

In the preferred embodiment, parallel spaced apart living hinges or fold lines 32, 34 and 36 are formed across the side panels 24, 26 and the planar member 14. Fold lines 32 and 34 define a first fold area 33 and fold lines 34 and 36 define a second fold area 35. The fold lines allow the side panels and the planar member to be folded over one another in order to adjust the length of the liner 10 as more fully described below but without affecting the upwardly extending front panel 28. The fold lines are preferably lines of reduced thickness which may be formed by compressing the areas under heat and pressure.

The preferred material for the expandable liner 10 is a heavy duty vinyl coated polyester fabric available from Cooley, Inc. of Pawtucket, R.I. However, a variety of other flexible materials could be utilized.

Formed adjacent the outer end of each of the side panels 24 and 26 of the liner 10 are a plurality of eyelets such as shown at 40 in FIGS. 2, 3 and 5. Preferably, there are four eyelets formed in each of the side panels. However, the number of eyelets can be varied.

In order to secure the expandable protective liner 10 to the rear cargo area of the vehicle 12, a plurality of suction cups are provided such as shown at 42 in FIGS. 1 and 3. Each of the suction cups is releasably secured to the windows located above the side wall portions of the sport utility vehicle 12. Extending downwardly from each of the suction cups 40 is a hook member 44. Each of the hook members 44 has a curved free end 46.

The expandable protective liner 10 is releasably secured in the rear cargo area of the vehicle 12 in the following manner. The front panel 28 is positioned against the seat back portion of the vehicle 12 as shown in FIG. 1. It should be noted that the front panel of the liner can be positioned against the seat back portion of either the front or rear seats of the vehicle depending on whether the rear seats are in their upright or folded condition.

Side panel 24 is positioned to cover one of the side wall portions of the vehicle and side panel 26 is similarly positioned to cover the other side wall portion of the vehicle. In some instances, the installer will find that the liner 10 is longer than the rear cargo area. If this is the case, the liner can be shortened by folding the same about fold lines 32 and 34 so that the first fold area 33 is upside down and overlies area 35 of the floor portion 15 and the side panels 24 and 26 are similarly folded over themselves as shown in FIGS. 1, 2 and 4. Thus in the area between the folds, the floor portion and sides of the liner will be of a triple thickness of material as shown in FIG. 4. If the liner is still too long, the liner can folded about fold line 36 so that both the first and second areas 33 and 35, respectively, overlie part of the planar member 14 and the side panels 24 and 26. It should be noted that several other fold lines can be formed across the side panels 24, 26 and the planar member 14 to allow the length of the liner to be further varied.

Once the appropriate length has been obtained. A different suction cup 42 is secured to the window of the vehicle located immediately above a corresponding one of the eyelets 40 formed in each of the side panels 24 and 26. The curved end 46 of the hook member 44, which extends downwardly from each of the suction cups 46, is positioned through a corresponding one of the eyelets 40 to maintain the appropriate position of the liner 10 as illustrated in FIGS. 1 and 3. With the liner so positioned, the rear cargo area of the vehicle 12 is sufficiently protected against damage caused by objects placed in the same.

The present invention may be embodied in other specific forms without departing from the spirit or essential attributes thereof and accordingly reference should be made to the appended claims rather than to the foregoing specification as indicating the scope of the invention.

What is claimed is:

1. An expandable protective liner for protecting a rear cargo area of a vehicle defined by a floor, a pair of opposing side wall portions, a tail gate portion, and a seat back portion, said liner comprising:

a planar member having a floor portion with a front end, a rear end and two sides, said planar member being adapted to cover said floor of said rear cargo area;

a pair of side panels, each of said side panels extending from a corresponding one of said sides of said floor portion, each of said side panels being adapted to cover a corresponding one of said wall portions of said rear cargo area, said floor portion and said side panels having a substantially equivalent length;

a front panel interconnected to and extending upwardly from said front end of said floor portion of said planar member, said front panel being adapted to cover said seat back portion of said rear cargo area;

a rear panel extending from said rear end of said floor portion of said planar member, said rear panel being adapted to cover said tail gate portion of said rear cargo area;

at least two parallel spaced apart fold lines of reduced thickness located across said side panels and said floor portion of said planar member, each of said fold lines being spaced from and being located rearwardly of said upwardly extending front panel for allowing said side panels and said floor portion of said planar member to be partially folded over themselves in order to adjust the length of the same without affecting said front panel, and means for releasably securing said expandable liner in said rear cargo area.

2. The protective liner of claim 1 wherein said rear panel is hingedly connected to said rear end of said planar member.

3. The protective liner of claim 1 wherein said securing means includes a plurality of suction cups adapted to be secured above said side walls of said rear cargo area, a plurality of hook members, and a plurality of eyelets formed in each of said side panels, each of said hook members extends downwardly from a corresponding one of said suction cups and has a curved free end, each of said curved ends of said hooked members adapted to extend through a corresponding one of said eyelets.

4. The protective liner of claim 1 wherein said planar member, said side panels, said front panel and said rear panel are comprised of a flexible material.

5. The protective liner of claim 4 wherein said flexible material is polyester fabric.

6. The protective liner of claim 1 further including a third fold line formed across said side panels and said planar member.

7. The protective liner of claim 1 wherein said front panel is connected to each of said side panels.

8. An expandable protective liner for protecting a rear cargo area of a vehicle defined by a floor, a pair of opposing side wall portions, a tail gate portion, and a seat back portion, said liner comprising:

a planar member having a front end, a rear end and two sides, said planar member being adapted to cover said floor of said rear cargo area;

a pair of side panels, each of said side panels extending from a corresponding one of said sides of said planar member, each of said side panels being adapted to cover a corresponding one of said wall portions of said rear cargo area, said planar member and said side panels having a substantially equivalent length;

a front panel extending from said front end of said planar member, said front panel being adapted to cover said seat back portion of said rear cargo area;

a rear panel extending from said rear end of said planar member, said rear panel being adapted to cover said tail gate portion of said rear cargo area;

at least two fold lines located across said side panels and said planar member for allowing said side panels and said planar member to be partially folded over one another in order to adjust the length of the same, and means for releasably securing said expandable liner in said rear cargo area, said securing means including a plurality of suction cups adapted to be secured above said side walls of said rear cargo area, a plurality of hook members, and a plurality of eyelets formed in each of said side panels, each of said hook members extending downwardly from a corresponding one of said suction cups and having a curved free end, each of said curved ends of said hooked members being adapted to extend through a corresponding one of said eyelets.

9. The protective liner of claim 8 wherein said rear panel is hingedly connected to said rear end of said planar member.

10. The protective liner of claim 8 wherein said planar member, said side panels, said front panel and said rear panel are comprised of a flexible material.

11. The protective liner of claim 10 wherein said flexible material is polyester fabric.

12. The protective liner of claim 8 further including a third fold line formed across said side panels and said planar member.

13. The protective liner of claim 8 wherein said front panel is connected to each of said side panels.

\* \* \* \* \*